United States Patent
Gan et al.

(10) Patent No.: US 7,369,714 B2
(45) Date of Patent: May 6, 2008

(54) HIGH-SPEED ELECTRONIC CARRIER-INJECTION MODULATOR BASED ON HIGH-INDEX-CONTRAST SI-WAVEGUIDE

(75) Inventors: Fuwan Gan, Cambridge, MA (US); Franz X. Kaertner, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 92 days.

(21) Appl. No.: 11/120,769

(22) Filed: May 3, 2005

(65) Prior Publication Data

US 2005/0271315 A1 Dec. 8, 2005

Related U.S. Application Data

(60) Provisional application No. 60/570,351, filed on May 12, 2004, provisional application No. 60/613,912, filed on Sep. 28, 2004.

(51) Int. Cl.
*G02F 1/035* (2006.01)
*G02F 1/01* (2006.01)
(52) U.S. Cl. .................... 385/2; 385/3; 385/1; 385/8
(58) Field of Classification Search .................. 385/2–3
See application file for complete search history.

(56) References Cited

U.S. PATENT DOCUMENTS

| 5,278,923 | A | * | 1/1994 | Nazarathy et al. ............. 385/3 |
| 5,787,211 | A | * | 7/1998 | Gopalakrishnan ............... 385/2 |
| 6,504,640 | B2 | * | 1/2003 | Gopalakrishnan ............ 359/245 |
| 6,872,966 | B2 | * | 3/2005 | Akiyama et al. ............... 257/14 |
| 2002/0110302 | A1 | * | 8/2002 | Gopalakrishnan ............... 385/2 |
| 2003/0003736 | A1 | * | 1/2003 | Delwala ...................... 438/689 |

OTHER PUBLICATIONS

Samara-Rubio, D. et al., "A gigahertz silicon-on-insulator Mach-Zehnder modulator," Optical Fiber Communication Conference, Los Angeles, Feb. 23-25, 2004, Piscataway NJ, Feb. 26, 2004, pp. 701-703.
Boussey et al. "Optoelectronic integration in silicon-on-insulator technologies," Semiconductor Conference, 1998. New York, NY, vol.2 Oct. 6, 1998, pp. 407-415.
Fischer, U. et al., "Optical Waveguide Switches in Silicon Based on Ge-Indiffused Waveguides," Photonics Technology Letters, Inc. New York, NY, vol. 6 No. 8, Aug. 1, 1994. pp. 978-980.
Barrios, C. A. et al. "Electrooptic Modulation of Silicon-on-Insulator Submicrometer-Size Waveguide Devices," Journal of Lightwave Technology, vol. 21, No. 10, Oct. 2003 pp. 2332-2339.
Dainesi, P. et al., "CMOS Compatible Fully Integrated Mach-Zehnder Interferometer in SOI Technology," Photonics Technology Letters, Inc., New York, vol. 12, No. 6, Jun. 2000, pp. 660-662.

* cited by examiner

*Primary Examiner*—Frank G. Font
*Assistant Examiner*—Eric Wong
(74) *Attorney, Agent, or Firm*—Gauthier & Connors LLP

(57) ABSTRACT

An opto-electronic modulator includes a Mach-Zehnder structure that comprises $p^+in^+$-diodes in both arms of the Mach-Zehnder structure. The Mach-Zehnder structure is formed by waveguides so as to confine an optical mode in the opto-electronic modulator.

13 Claims, 3 Drawing Sheets

HIGH-SPEED ELECTRONIC CARRIER-INJECTION MODULATOR BASED ON HIGH-INDEX-CONTRAST SI-WAVEGUIDE

PRIORITY INFORMATION

This application claims priority from provisional application Ser. No. 60/570,351 filed May 12, 2004 and provisional application Ser. No. 60/613,912 filed Sep. 28, 2004, both of which are incorporated herein by reference in their entireties.

This invention was made with government support under Grant Number ECS-0322740 awarded by the NSF. The government has certain rights in the invention.

BACKGROUND OF THE INVENTION

The invention relates to the field of modulators, and in particular to an electrically driven Mach-Zehnder waveguide modulator based on high-index contrast silicon waveguide technology and electronic carrier injection.

The development of future electronic-photonic integrated circuits based on silicon technology critically depends on the availability of CMOS-compatible high-speed modulators that enable the interaction of electronic and optical signals. Si-based phase modulators using the plasma dispersion effect in a $p^+in^+$-structure have been proposed for silicon-based opto-electronic phase and amplitude modulators. Switching speeds up to 10 MHz have been demonstrated and up to 1 GHz are predicted. The speed of the response in these devices is limited by carrier recombination. Very recently a modulator based on a MOS structure has been proposed operating at 1 GHz speed. However, this device needs an applied voltage of 10V for achieving a $\pi$ phase shift within 1 cm length and showed 6.7 dB loss due to the doped polysilicon rib-waveguide. Much lower drive voltage in the order of 1-5V is needed, when feed by CMOS circuitry. The same is true for top contacted rib-waveguides of previously proposed pin-structures.

SUMMARY OF THE INVENTION

According to one aspect of the invention, there is provided an opto-electronic modulator. The opto-electronic modulator includes a Mach-Zehnder structure that comprises $p^+in^+$-diodes in both arms of the Mach-Zehnder structure. The Mach-Zehnder structure is formed by waveguides so as to confine an optical mode in the opto-electronic modulator.

According to another aspect of the invention, there is provided a method of forming an opto-electronic modulator. The method includes forming a Mach-Zehnder structure that comprises $p^+in^+$-diodes in both arms of the Mach-Zehnder structure. Moreover, the method includes the use of waveguides to construct the Mach-Zehnder structure so as to confine an optical mode in the opto-electronic modulator.

According to another aspect of the invention, there is provided an opto-electronic modulator having a Mach-Zehnder structure that comprises $p^+$ and $n^+$ doped regions in both arms of the Mach-Zehnder structure. A The Mach-Zehnder structure is formed by waveguides so as to confine an optical mode in the opto-electronic modulator.

DETAILED DESCRIPTION OF THE INVENTION

Si-based phase modulators using the plasma dispersion effect in a $p^+in^+$-structure have been proposed for silicon-based opto-electronic phase and amplitude modulators. Switching speeds up to 10 MHz have been demonstrated and up to 1 GHz are predicted. The speed of the response in these devices is limited by thermal effects and carrier recombination times. Very recently a modulator based on a MOS structure has been proposed operating at 1 GHz speed. However, this device needs an applied voltage of 10V for achieving a phase shift within 1 cm length and showed 6.7 dB loss due to the doped polysilicon rib-waveguide. Much lower drive voltage in the order of 1-5V is needed, when feed by CMOS circuitry. The same is true for top contacted rib-waveguides of previously proposed pin-structures. Here a $Si/SiO_2$ high-index contrast waveguide modulator is proposed that shows corner frequencies of up to at least 24 GHz.

Figure 1A:
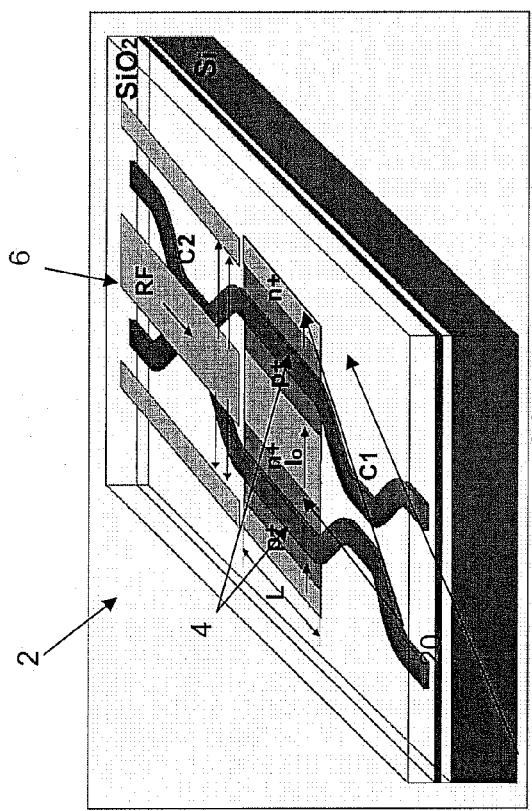
FIG. 1A is a schematic diagram illustrating an externally-biased Mach-Zehnder modulator with coplanar RF-feeder.
Figure 1B:
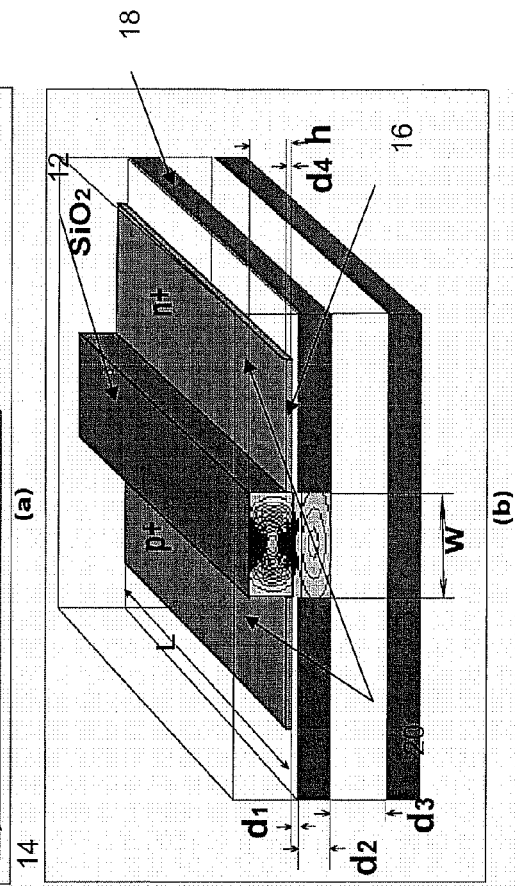
FIG. 1B is a schematic diagram illustrating a split-ridge waveguide pin-phase modulator with single mode intensity profile.

A schematic layout of modulator 2 in accordance with the invention is shown in FIGS. 1A-1B. FIG. 1A shows a conventional Mach-Zehnder arrangement, and FIG. 1B shows the most important sub-component 12 of the modulator 2, the electrically driven phase modulator section. Here one can use a split-rib waveguide 12, i.e. the high-index rib 12 is separated from the high-index slab 18 via a thin low index layer 16, which combines the following advantages of a buried waveguide and a rib waveguide, as shown in FIG. 1B. The optical mode is mostly confined in the buried section of the waveguide, 94%, which is isolated so that injected carriers cannot escape in transverse directions. Since the $SiO_2$-isolating layer 16, which splits the rib-waveguide 12, is rather thin (d1=100 nm), there is good heat sinking to the silicon slab portion 18 of the waveguide. The optical mode is well confined within the rib 12 in horizontal direction, which greatly reduces loss due to the highly doped contact regions and sidewall roughness.

Even doping levels as high as $n_D=10^{19}$ cm$^{-3}$ in the contact regions 20 lead only to $\alpha$=2.8/cm optical absorption. In other embodiments of this invention different waveguide geometries might be used.

The $p^+in^+$-diodes in both arms 4 of the Mach-Zehnder modulator 2 are biased in series and a static current is driven through both arms 4, leading to equal phase shifts, absorption and heating in both arms 4 of the Mach-Zehnder modulator 2. This ensures that the thermo-optic effects due to the bias current in both arms 4 are balanced to a large degree. The RF-signal is capacitively-coupled to the diodes out of phase via the even mode of a coplanar transmission line 8, as shown in FIG. 1A. Exploiting this design small signal modulators operating up to speeds of at least 24 GHz seem feasible.

The electrical and thermal characteristics of the phase modulator sections are evaluated using the semiconductor device simulator MEDICI. Subsequently, the optical characteristics of the phase modulator sections, i.e. effective optical index and absorption changes, and the resulting Mach-Zehnder modulator 2 characteristics are determined from these computations by exporting the electrical and thermal characteristics and building proper averages over the optical mode profile that is calculated separately with the software tool FIMMWAVE. The carrier lifetime is dynamically adjusted including surface, Shockley-Read-Hall (SRH), and Auger recombination. The carrier lifetime in the intrinsic section can be varied over a wide range using doping or ion implantation. Simulations with three values for the electron/hole lifetimes have been performed: $\tau$=10, 100, and 1000 ps.

The contact resistivity is assumed to be small, about $10^{-7}$ $\Omega cm^2$. Therefore, most of the voltage drop is located in the i-region of the pin-modulator. For short carrier lifetimes, the electric field can be increased to a level where the current flow gets close to saturation and the carriers drift at the saturation velocity vs=$10^7$ cm/s in silicon. The carriers injected into the i-region induce a change in refractive index and optical absorption. The effective index and absorption of the guided mode are obtained by averaging over the spatially varying index and absorption using the numerically determined optical mode profile of the split-ridge waveguide 12, see FIG. 1B.

Figure 2A:
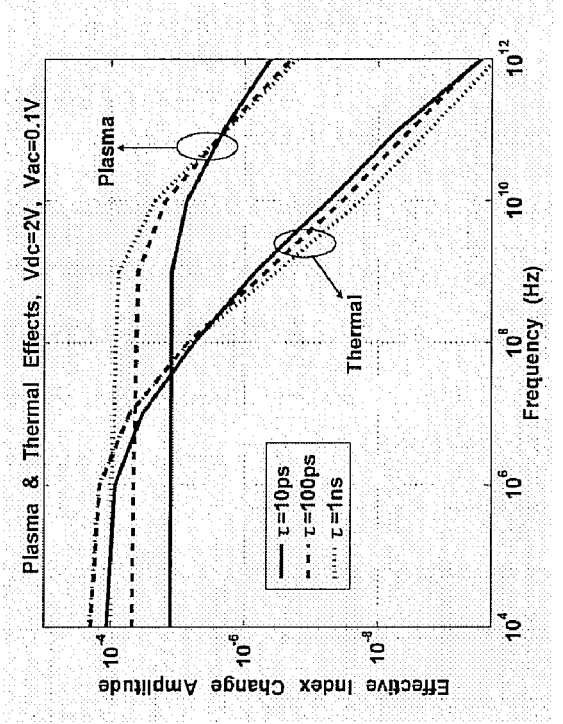
FIG. 2A is a graph illustrating the modulator I-V-characteristics and maximum device temperature Tm at different operating points and carrier lifetimes $\tau$=10 ps, 100 ps, 1 ns.

Detailed two-dimensional simulations have been carried out for a device with dimensions: $d_1$=100 nm, $d_2$=350 nm, $d_3$=2 µm, $d_4$=100 nm, h=550 nm and w=1 µm assuming longitudinal homogeneity. The static I-V characteristics of the phase modulator section for the three different carrier lifetimes are shown in FIG. 2A together with the maximum temperature occurring in the device at different operating points. For voltages greater than 6V the current saturates. Acceptable internal operating temperatures between 300K and 400K are computed for this device at operating voltages of 2V and 4V. The heat is efficiently removed from the device via metal contacts and the thin slab-Si layer, as shown in FIG. 1B. For the case of a 10 ps carrier lifetime, roughly 65% of the heat escapes over the metal contacts and 35% over the Si-slab. Thus the Si-slab layer does not only reduce the waveguide loss by better mode confinement in the rib but in addition greatly improves the heat sinking.

The AC characteristics of the device are determined by computing the small signal modulation transfer function between effective index change in the phase modulator section and the applied voltage. The modulation speed of a pin-diode depends critically on the carrier recombination time and drift velocity. The faster of the two processes, recombination or drift, determines the 3 dB corner frequency of the AC-response.

For a structure with a carrier lifetime equal to or shorter than 1 ns, and assuming a thermally grown oxide passivation with a surface recombination velocity of 100 cm/sec., SRH-recombination dominates the carrier lifetime. The SRH-lifetime depends on the density of recombination centers due to the doping or ion bombardment. At high carrier injection, the SRH recombination time is in the order of $\tau_{SHR}$=2$\tau$, where $\tau$ itself depends on the carrier concentration. Correspondingly, the 3 dB corner frequencies due to recombination are $$f_{3dB}^{recom} = 1/2\pi\tau_{SHR} = 1/4\pi\tau = 8\text{ GHz}, 0.8\text{ GHz}, 0.08\text{ GHz}$$

for $\tau$=10 ps, 100 ps, and 1 ns, respectively.

Figure 2B:
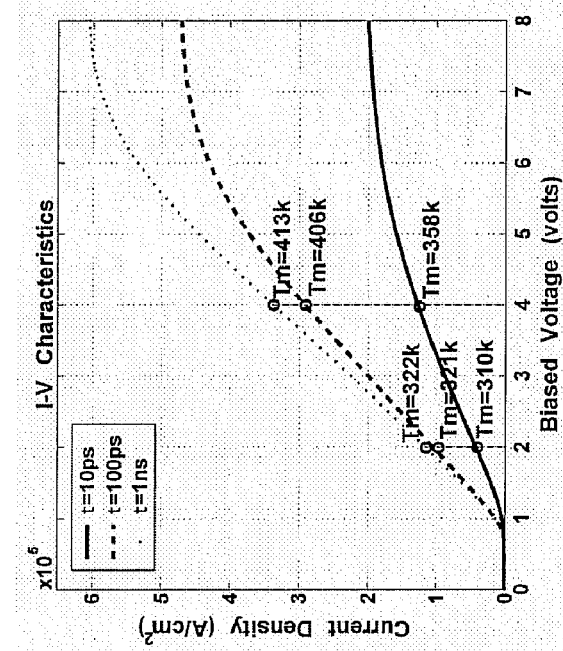
FIG. 2B is a graph illustrating the effective index change due to plasma and thermal effects for $\tau$=10 ps, 100 ps, and 1 ns.

In addition to recombination, carrier drift under the strong applied filed is also important for determination of the achievable modulating speed. The simulations gave hole/electron velocities v≈8×$10^6$ cm/s, 2.4×$10^6$ cm/s and 2.4×$10^6$ cm/s for $\tau$=10 ps, 100 ps, and 1 ns, which corresponds to $$f_{3dB}^{drift} = 2.2/2\pi\tau_{drift} = 28\text{ GHz}, 3\text{ GHz}, 2.6\text{ GHz}$$

with $\tau_{drift}$=w/v. In summary, one can obtain the combined 3 dB frequency $$f_{3dB} = \text{MAX}(f_{3dB}^{recom}, f_{3dB}^{drift}) = 28\text{ GHz}, 3\text{ GHz}, 2.6\text{ GHz},$$

which matches the resulting corner frequencies from the simulations rather well, as shown in FIG. 2B: 24 GHz, 2 GHz, and 1 GHz. FIG. 2B shows both, the effective index change due to thermal effects and due to the plasma dispersion effect. For frequencies f>1 GHz, the plasma effect is at least 10 times larger.

At low frequencies thermal effects dominate because the thermal time constant is about 30 ns and, therefore, much longer than the carrier lifetimes used in the simulations. This is of major importance, because both effects do have opposite sign and therefore, there is a frequency range, 1-100 MHz, where the response is zero. If a modulator for a combined low and high frequency range is desired, this problem can be fixed by using two modulators with widely different carrier lifetimes in series, which address the low and high frequency ranges of the input signal separately. A similar modulator as in FIG. 1 with a carrier lifetime of 30 ns could be used to modulate the low frequency band from 0-100 MHz.

To bias the modulator section one can dissipate a DC-power $P_{DC}$=$V_{DC}$·$I_{DC}$, where the DC-current $I_{DC}$ is the current density from FIG. 2A multiplied by the cross section of the device through the ridge. Operating at a bias voltage, $V_{DC}$=2V, one can obtain for the DC-power of a 1 mm long section according to FIG. 1B, with the area A=0.55 µm×1 mm=5.5×$10^{-6}$ $cm^2$, the DC power $P_{DC}$=V·I=2V·4.545×$10^4$ A/$cm^2$·5.5×$10^{-6}$ $cm^2$=500 mW.

At this bias point and a modulation frequency f=10 GHz, with amplitude (half peak-to-peak) $V_{AC}$=1V the simulation gives for the amplitude of the AC current density $J^{AC}$=2.78×$10^4$ A/$cm^2$, resulting in a dissipated microwave power of $P_{AC}$=1/2$V_{AC}I_{AC}I_{AC}$ cos φ=1/2·1V·2.78×$10^4$ A/$cm^2$·0.5.5×$10^6$ cm cos 18°=76 mW. The corresponding amplitude of the effective index change is Δn=−1.5254×$10^{-4}$.

To achieve a phase shift of π at a wavelength of 1.55 µm a 5 mm long section would be necessary, resulting in a figure of merit, FOM=0.5V·cm, of the phase modulator section. Note, for a MZ-modulator a differential phase shift of π is necessary between the two arms to achieve full on off modulation which is possible for a 1 V amplitude signal and 2.5 mm long phase modulator sections in each arm resulting in a total DC-Power consumption of 2.5 W and an estimated microwave power of 380 mW. The loss due to injected carriers can easily be taken into account and are in general small, only about half of the loss due to the doped contact regions. Both the losses and the phase shift depend approximately linearly on the injected carriers and, therefore, one can obtain for the relationship of total losses accumulated in the structure versus phase shift $\alpha \cdot L \approx \phi/4$, which leads after a short analysis to the following transmission characteristic of the modulator:

$$T(\phi) = \frac{1}{2} \cdot \exp[-(\alpha_C + \alpha_{DC})L][\cosh(\phi/4) - \cos(2\phi)] \quad \text{Eq. 1}$$

for $|\phi|<\pi/2$. For the current example of a 2.5 mm long structure the total static losses due to contact doping and the DC-bias current would be about $$10\log_{10}[\text{Exp}((\alpha_c+\alpha_{DC})L)]=4 \text{ dB} \quad \text{Eq. 2}$$

not including possible bend and scattering losses due to sidewall roughness.

Figure 3A:
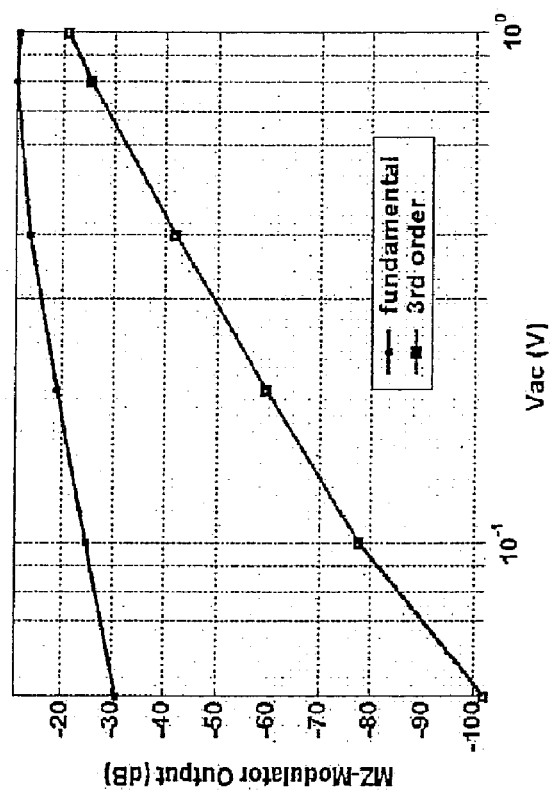
FIG. 3A is a graph illustrating the linearity of the effective index modulation in a pin-section.
Figure 3B:
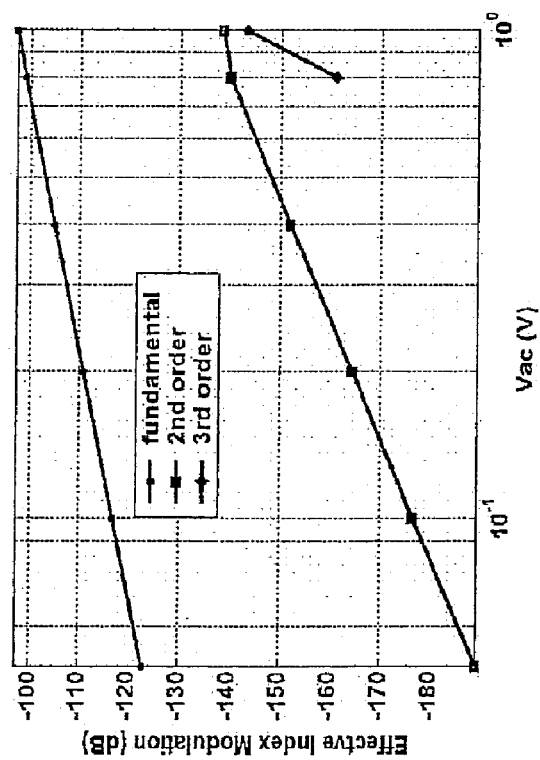
FIG. 3B is a graph illustrating the linearity of the MZ-modulator transmission, at bias voltage $V_{DC}$=4V, modulation Frequency f=10 GHz, carrier lifetime $\tau$=10 ps.

For the purpose of analog sampling and electrical to optical information transfer in general an important key-characteristic of a modulator is its linearity. For the proposed MZ-modulator this problem translates into the nonlinearity of the MZ-transmission as function of the induced phase shift and the linearity of the generated phase shift as a function of the input voltage. The linearity of the pin-structure in FIG. 1B is displayed in FIG. 3A. For input voltage amplitudes $V_{ac}$ 0.1V, the difference between fundamental and 2nd harmonic is larger than 60 dB and negligible 3rd harmonic is generated up to voltage amplitudes $V_{ac}$ 0.8V. The transfer characteristic of the MZ-structure is given by $$T(\Delta n) = 1 - \sin^2\left(\frac{2\pi L}{\lambda}\Delta n + \varphi_0\right) \quad \text{Eq. 3}$$

where $\phi_0$ can be biased thermally to $\pi/4$ at an inflection point to eliminate 2nd harmonic. Therefore, the 3rd harmonic governs the non-linearity of the modulator. FIG. 3B shows the fundamental and 3rd order harmonic output of MZ-modulator in terms of its transmission: 10log(T) in dB. FIGS. 3A-3B show that the nonlinearity is limited by the MZ-Transmission, which can in principle be eliminated by using both outputs of the MZ-modulator.

In summary, a high-speed electronic carrier-injection modulator has been proposed and investigated based on a high-index-contrast Si-waveguides. In one embodiment a split-rib waveguide was used. Operation in the saturation region, i.e. the pin junctions are always biased in forward direction, with a carrier saturation velocity $v_s=10^7$ cm/s and short carrier lifetime $\tau=10$ ps by lifetime doping or ion bombardment, this modulator can be driven in the range of 1-30 GHz. In that range the plasma effect overwhelms the thermal effect about 10-fold.

Although the present invention has been shown and described with respect to several preferred embodiments thereof, various changes, omissions and additions to the form and detail thereof, may be made therein, without departing from the spirit and scope of the invention.

What is claimed is:

1. An opto-electronic modulator:
    a Mach-Zehnder structure that comprises Si-based p$^+$in$^+$-diodes in both arms of the Mach-Zehnder structure, said Mach-Zebnder structure is formed by Si-waveguides so as to confine an optical mode in the opto-electronic modulator, said Si-based p$^+$in$^+$-diodes are biased in series and a static current is driven through both arms leading to both equal phase shifts, absorption, and heating in said both arms ensuring that thermo-optics effects due to a bias current in said both arms are balanced; and
    a coplanar transmission line providing a RF-signal that is capacitively-coupled to said Si-based p$^+$in$^+$-diodes and said RF signal being out of phase via the even mode of said coplanar transmission line.

2. The opto-electronic modulator of claim 1, wherein said waveguide structure is electrically driven.

3. The opto-electronic modulator of claim 1, wherein said waveguide structure comprises a rib-waveguide.

4. The opto-electronic modulator of claim 1, wherein said waveguides comprise a buried-waveguide.

5. The opto-electronic modulator of claim 1 further comprising a SiO$_2$-isolating layer, which splits the rib-waveguide from said Mach-Zebnder structure.

6. The opto-electronic modulator of claim 1, wherein said p$^+$in$^+$-diodes capacitively-couple a RF-signal 6.

7. The opto-electronic modulator of claim 1 further comprising at least one contact region having doping levels as high as $n_D=1^{19}$cm$^3$.

8. The opto-electronic modulator of claim 7, wherein said at least one contact region comprises a contact resistivity of approximately $10^{-7}$ Ω cm$^2$.

9. An opto-electronic modulator comprising:
    a Mach-Zebnder structure that comprises p$^+$ and n$^+$ doped Si-regions in both arms of the Mach-Zehnder structure, said Mach-Zebnder structure is formed by Si-waveguides so as to confine an optical mode in the opto-electronic modulator, said Si-based p$^+$in$^+$-diodes are biased in series and a static current is driven through both arms leading to both equal phase shifts, absorption, and heating in said both arms ensuring that thermo-optics effects due to a bias current in said both arms are balanced; and
    a coplanar transmission line providing a RF-signal that is capacitively-coupled to said Si-Si-based p$^+$in$^+$-diodes and said RF signal being out of phase via the even mode of said coplanar transmission line.

10. The opto-electronic modulator of claim 9, wherein said waveguide structure is electrically driven.

11. The opto-electronic modulator of claim 9, wherein said p$^+$ and n$^+$ doped regions capacitively-couple a RF-signal 6.

12. The opto-electronic modulator of claim 9 further comprising at least one contact region having doping levels as high as $n_D 10^{19}$cm$^{-3}$.

13. The opto-electronic modulator of claim 12, wherein said at least one contact region comprises a contact resistivity of approximately $10^{-7}$ Ω cm$^2$.

* * * * *